United States Patent
Winarski et al.

(10) Patent No.: US 10,930,309 B1
(45) Date of Patent: Feb. 23, 2021

(54) TAPE-CREEP DETECTION VIA TRAJECTORY AND DISTORTION ANGLES

(71) Applicant: International Business Machines Corporation, Armonk, NY (US)

(72) Inventors: Daniel James Winarski, Tucson, AZ (US); Nhan Xuan Bui, Tucson, AZ (US); Lee Curtis Randall, Tucson, AZ (US); Richard Bradshaw, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/667,188

(22) Filed: Oct. 29, 2019

(51) Int. Cl.
| | | |
|---|---|---|
| G11B 5/09 | (2006.01) | |
| G11B 5/55 | (2006.01) | |
| G11B 5/53 | (2006.01) | |
| G11B 5/008 | (2006.01) | |
| G06F 17/11 | (2006.01) | |

(52) U.S. Cl.
CPC ........ *G11B 5/5508* (2013.01); *G11B 5/00817* (2013.01); *G11B 5/534* (2013.01); *G06F 17/11* (2013.01)

(58) Field of Classification Search
None
See application file for complete search history.

(56) References Cited

U.S. PATENT DOCUMENTS

| | | | |
|---|---|---|---|
| 4,295,168 A * | 10/1981 | Muller | G11B 5/00813 360/31 |
| 5,347,203 A | 9/1994 | Swinson | |
| 6,320,719 B1 | 11/2001 | Albrecht | |
| 6,687,070 B1 * | 2/2004 | Peterson | G11B 5/00817 360/31 |
| 7,072,133 B1 | 7/2006 | Yip | |
| 7,139,151 B2 | 11/2006 | Johnson | |
| 7,403,350 B2 | 7/2008 | Bates | |
| 7,876,521 B2 | 1/2011 | Cherubini | |
| 7,881,013 B2 | 2/2011 | Ishikawa et al. | |
| 7,889,454 B2 | 2/2011 | Johnson | |
| 8,054,568 B2 | 11/2011 | Cherubini | |
| 8,582,246 B2 | 11/2013 | Hoerger | |
| 8,619,384 B1 | 12/2013 | Bates et al. | |
| 8,760,795 B2 | 6/2014 | Cherubini | |
| 8,896,960 B2 | 11/2014 | Bates et al. | |

(Continued)

FOREIGN PATENT DOCUMENTS

WO     9965018 A2    12/1999

OTHER PUBLICATIONS

Argumendo et al., "Scaling tape recording areal densities to 100 Gb/in2", 2008, 15 pgs.

(Continued)

*Primary Examiner* — Peter Vincent Agustin
(74) *Attorney, Agent, or Firm* — Jared L. Montanaro

(57) ABSTRACT

A tape drive may calculate the slopes for three successive timing-based-servo marks in a timing-based-servo group. The timing-based-servo marks may be arranged in a one or more M-patterns. The three successive timing-based-servo marks may be across the one or more M-patterns. The tape drive may perform a parabolic fit of a gradient of the slopes. The tape drive may determine whether the gradient is demonstrative of tape-creep.

20 Claims, 5 Drawing Sheets

(56) References Cited

U.S. PATENT DOCUMENTS

| | | | |
|---|---|---|---|
| 9,324,350 | B2 | 4/2016 | Biskeborn et al. |
| 9,443,540 | B2 | 9/2016 | Biskeborn |
| 10,276,204 | B1 | 4/2019 | Judd |
| 10,347,282 | B2 | 7/2019 | Pantazi |
| 10,475,477 | B1 | 11/2019 | Biskeborn |
| 2004/0174132 | A1* | 9/2004 | Johnson ............... G11B 5/584 318/652 |
| 2006/0092547 | A1* | 5/2006 | Kawakami ............ G11B 5/584 360/71 |
| 2007/0230054 | A1 | 10/2007 | Takeda et al. |
| 2008/0186610 | A1* | 8/2008 | Bui ....................... G11B 5/584 360/55 |

OTHER PUBLICATIONS

Connolly et al., "Stress Analysis of Wound Magnetic Tape," Trilogy and Mechanics of Magnetic Storage Systems, ASLE Special Publication SP-16, 12 pgs.

ECMA International, "Standard ECMA-319," https://www.ecma-international.org/publications/standards/Ecma-319.htm, printed Aug. 17, 2019, 1 pg.

ECMA, "Data Interchange on 12,7 mm 384-Track Magnetic Tape Cartridges—Ulhium-1 Format," Standardizing Information and Communication Systems, Standard ECMA-319, Jun. 2001, 160 pgs.

List of IBM Patents or Patent Applications Treated as Related, Oct. 24, 2019, 2 pgs.

Wikipedia, "Linear Tape-Open—Wikipedia," https://en.wikipedia.org/wiki/Linear_Tape-Open, printed Aug. 7, 2019, 12 pgs.

Winarski et al., "Tape-Creep Detection Via Frequency Domain Data," U.S. Appl. No. 16/667,107, filed Oct. 29, 2019.

Winarski et al., "Tape-Creep Detection Via Trajectory and Distortion Angles," U.S. Appl. No. 16/667,249, filed Oct. 29, 2019.

R.C. Barrett, et al., "Timing-Based Track-Following Servo for Linear Tape Systems." Published Jul. 4, 1998. 6 pages. vol. 34 No. 4.

Takuji Higashioji, et al., "Creep and Shrinkage Behavior of Improved Alternate Substrates for Magnetic Tapes." Published Jul. 2001 4 pages. vol. 37 No. 4.

* cited by examiner

US 10,930,309 B1

TAPE-CREEP DETECTION VIA TRAJECTORY AND DISTORTION ANGLES

BACKGROUND

The present disclosure relates generally to the field of tape drive systems, and more specifically to automatically detecting tape-creep via the tape drive itself.

The tape drive industry is constantly increasing the density of magnetic tape and in doing so the tolerance budget of the magnetic tape is shrinking. The shrinking tolerance budget results in the magnetic tape being increasingly exposed to creep of the polyethylene terephthalate substrate of the magnetic tape and creep of the recording frontcoat of binders and nanoparticles of the magnetic tape.

SUMMARY

Embodiments of the present disclosure include a method and system for allowing a tape drive to write from a tape cartridge with timing-based-servo marks. A tape drive may calculate the slopes for three successive timing-based-servo marks in a timing-based-servo group. The timing-based-servo marks may be arranged in a one or more M-patterns. The three successive timing-based-servo marks may be across the one or more M-patterns. The tape drive may perform a parabolic fit of a gradient of the slopes. The tape drive may determine whether the gradient is demonstrative of tape-creep.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
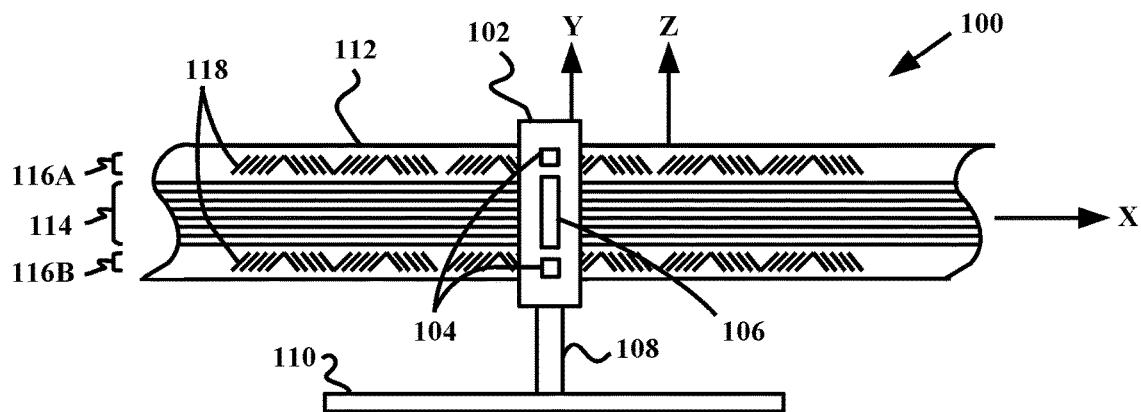
FIG. 1 illustrates an example of a timing-based-servo system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of tape drive systems, and more specifically to automatically detecting tape-creep via the tape drive itself. It should be noted that a "tape drive" is a system that utilizes tape to store information, further noted is that a "tape" is defined as a flexible magnetic tape medium. While the present disclosure is not necessarily limited to such applications, various aspects of the disclosure may be appreciated through a discussion of various examples using this context.

The tape drive industry is constantly increasing the density of magnetic tape and in doing so the tolerance budget of the magnetic tape is shrinking. The shrinking tolerance budget results in the magnetic tape being increasingly exposed to creep of the polyethylene terephthalate substrate of the magnetic tape (as it is typically stored at high tension for long periods of time) and creep of the recording frontcoat of binders and nanoparticles of the magnetic tape. Accordingly, a tape-creep sensor would be highly desirable at the tape drive level for high-density tape media used by tape drives for data input/output (I/O).

The basic M-pattern timing-based-servo looks like this: /\/\ (e.g., four servo marks configured to look like an "M"). The preferred implementation is that the M-pattern timing-based-servo is constructed by a dedicated servo-writing head that writes the M-pattern all at the same time. As discussed in regard to the present disclosure however, an embodiment is contemplated where a plurality of M-pattern timing-based-servo M's are written in a 5-5-5-5 M-pattern: /////\\\\\/////\\\\\.

In yet another embodiment, an M-Pattern is derived from today's timing-based-servos, which looks like this pattern: /////\\\\\/////\\\\, e.g., a 5-5-4-4 M-pattern. By combining servo marks as follows, in the first four servo marks in the first burst /////, the last four servo marks in the second burst \\\\\, the third burst ////, and the fourth burst \\\\, one to four suitable M-patterns may be constructed (e.g., because the last/fifth servo marks in the first and second bursts cannot be paired with any other servo marks on the third and fourth bursts as they include only four servo marks).

Regardless of if the 5-5-5-5 M-pattern or the 5-5-4-4 M-pattern is used for the purposes of this disclosure, a tape drive system itself is able to detect potential tape-creep before permanent errors result. Various thresholds are contemplated that are used for detecting the potential tape-creep. In one instance, a tighter, more restrictive threshold for write operations is contemplated to prevent existing data on the magnetic tape from being over-written, and a somewhat looser, less restrictive threshold for read operations is contemplated so that data may be read off the tape before the tape becomes unreadable. Further thresholds and various embodiments are now discussed further in regard to the FIGS.

Referring now to FIG. 1, illustrated an example of a timing-based-servo system 100, in accordance with embodiments of the present disclosure. In some embodiments, the timing-based-servo system 100 includes tape head actuator 102, base plate 110, actuator shaft 108, and tape 112.

In some embodiments, the tape head actuator 102 includes narrow servo read heads 104 and data read/write head 106. Further, the base plate 110 supports the actuator shaft 108 and the tape head actuator 102 moves along the actuator shaft 108 in the lateral Y direction via a servo motor or electromagnet (not shown). Typically, the tape head actuator 102 includes or is connected to a stepper motor arrangement for gross movements, and a voice coil arrangement for fine movements. For simplicity, these details are not shown.

In some embodiments, the tape 112 represents a portion of a linear tape medium (e.g., electromagnetic tape, etc.) that is ideally moving in the longitudinal X direction. The tape 112 includes a data track 114, shown with eight sub-tracks, sandwiched between two servo marks 116A and 116B that have been imprinted during the tape manufacturing process and/or logically arranged during operation of the timing-based-servo system 100 with a magnetic servo pattern 118 that consists of one or more servo marks arranged in a 5-5-5-5 M-pattern (or, in some embodiments, a 5-5-4-4 M-pattern, which is not shown) and which transitions with two different azimuthal angles, which will be described in greater detail below. Although only a single data track 114 is shown, the tape 112 typically has several data tracks separated by servo marks. In addition, each data track typically includes several sub-tracks, and the data read/write head 106 will include several read/write heads.

In some embodiments, during operation(s), the tape 112 moves in the longitudinal X direction past the tape head actuator 102. The servo read heads 104, which are small in the lateral dimension in comparison to the servo marks 116A and 116B, detect the servo patterns 118 in the servo marks 116A and 116B. Based on the timing of pulses generated by the servo read heads 104 reading the servo patterns 118, the position in the lateral Y direction of the servo read heads 104 relative to the position of the servo marks in the lateral Z direction can be determined.

Typically, there is approximate movement of the tape 112 in the lateral Z direction relative to the ideal longitudinal X direction of travel. To keep the data read/write head 106 in good alignment with the data track 114, a state variable feedback system controls the servo that moves the tape head actuator 102 along the actuator shaft 108 in the lateral Y direction based on the relative position of the servo read heads 104 and the ideal position relative to the servo marks 116A and 116B, which may be the centerline of the servo marks 116A and 116B or may be a lateral offset to that centerline.

Figure 2:
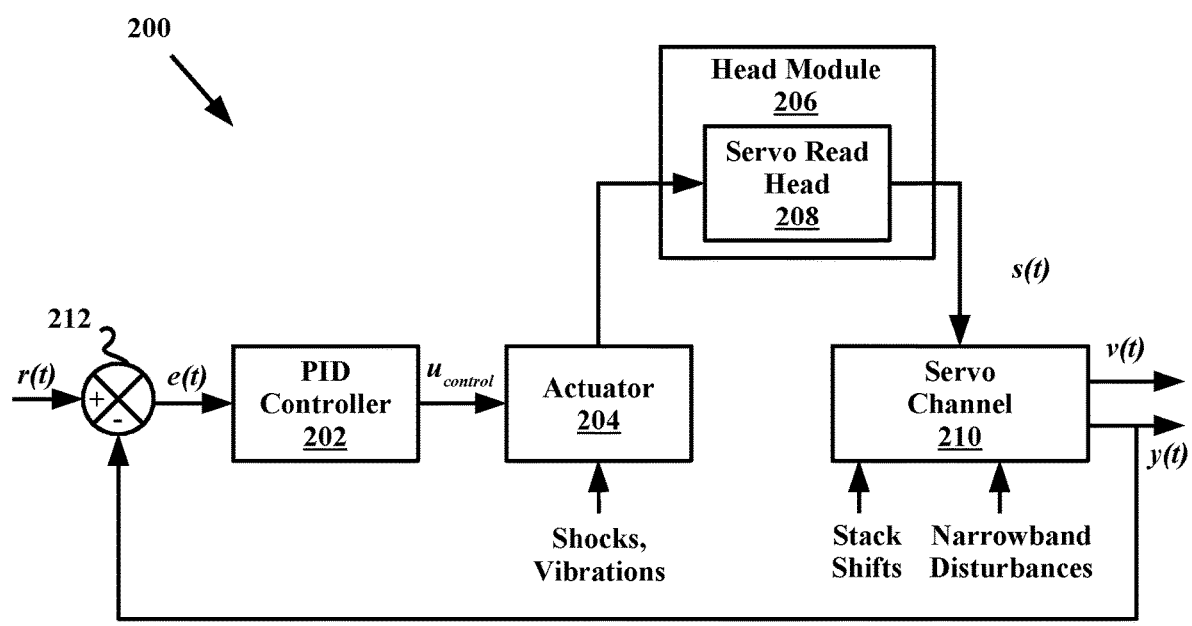
FIG. 2 depicts a block diagram of a timing-based-servo control system, in accordance with embodiments of the present disclosure.

Referring now to FIG. 2, depicted is a block diagram of a timing-based-servo control system 200, in accordance with embodiments of the present disclosure. In some embodiments, the timing-based-servo control system 200 may be the timing-based-servo system 100 and/or be an addition to the timing-based-servo system 100 of FIG. 1. In some embodiments, the servo control system 200 is based on a position error signal loop utilizing a proportional-integral-derivative (PID) controller 202. The servo control system 200 includes the PID controller 202, an actuator 204, a head module 206, at least one servo read head 208 located in or on the head module 206, a servo channel 210, and a subtractor 212.

FIG. 2 also shows various disturbances that are often present in typical tape drive systems (e.g., shocks, vibrations, stack shifts, and narrowband disturbances). FIG. 2 further shows a reference signal r(t), which is the reference signal associated with, for example, the centerline of the servo marks 116 of FIG. 1 to which the servo read head 208 should be tracking, a position error signal (PES) e(t), and a control signal, $u_{control}$, a signal s(t) provided by the servo read head 208 to the servo channel 210, a tape velocity estimate signal v(t), and a lateral position estimate signal y(t). PES e(t) corresponds to the difference between reference signal r(t) and lateral position estimate signal y(t).

With regard to FIG. 1, the actuator 204 and the head module 206 correspond generally to the tape head actuator 102, and the servo read head 208 corresponds to the servo read heads 104. The servo channel 210 may be implemented, for example, as a processor/microprocessor with microcode instructions stored either inside servo channel 210 or in a separate EPROM (not shown), or as a field-programmable gate array (FPGA), or as an application-specific integrated circuit (ASIC), or as a combination of the foregoing, or any other computing device capable of performing the functionality required in embodiments of the present disclosure.

In some embodiments, during operation(s), the servo control system 200 uses the PES e(t) as an input to the PID controller 202. The PID controller 202 outputs control signal $u_{control}$ to the actuator 204. Based on the control signal $u_{control}$, the actuator 204 adjusts the position of the head module 206, which in turn determines the position of the servo read head 208 and corresponding read/write heads (not shown). The read/write heads are maintained at a desired "on track" position via motion of the actuator 204 and also via feedback provided by the servo read head 208. Specifically, the servo read head 208 provides a signal s(t) to the servo channel 210. The servo channel 210 processes the signal s(t) to generate a lateral position estimate signal y(t) and a tape velocity estimate signal v(t), which indicates an estimate of the longitudinal velocity of the tape being read/written. Lateral position estimate signal y(t) along with reference signal r(t) is input to the subtractor 212, which outputs the PES difference signal e(t).

In the embodiments shown in FIGS. 1 and 2, the actuator 204 typically experiences vibrational resonances that is controlled. The mechanical behavior of the actuator 204 may be approximated by a simple spring-damper-mass model. As is known in the art, a state-space form of the differential equations representing a spring-damper-mass model is as follows:

$$\begin{bmatrix} \frac{dy}{dt} \\ \frac{d^2y}{dt} \end{bmatrix} = \begin{bmatrix} 0 & 1 \\ \frac{-k}{m} & \frac{-c}{m} \end{bmatrix} \begin{bmatrix} y \\ \frac{dy}{dt} \end{bmatrix} + \begin{bmatrix} 0 & 0 \\ Kf & Cf \end{bmatrix} \begin{bmatrix} z-y \\ \frac{dz}{dy} - \frac{dy}{dt} \end{bmatrix}$$

It is noted that in the equation presented above, all elements are known, except for z-y, and $$\frac{dz}{dt} - \frac{dy}{dt}.$$

In the equation, m is the mass of the tape head actuator 102 in kilograms, including any additional mass attributed to, for example, head cables and servo motors to be overcome when accelerating the tape head actuator 102 in the Y direction; k is the mechanical spring rate of the tape head actuator 102 in the Y direction, in Newtons per meter; and c is the mechanical damping experienced by the tape head actuator 102 in the Y direction, in Newton-seconds per meter. Additionally, Kf is the feedback coefficient with units of seconds$^{-2}$ and Cf is the feedback coefficient with units of second$^{-1}$.

Figure 3A:
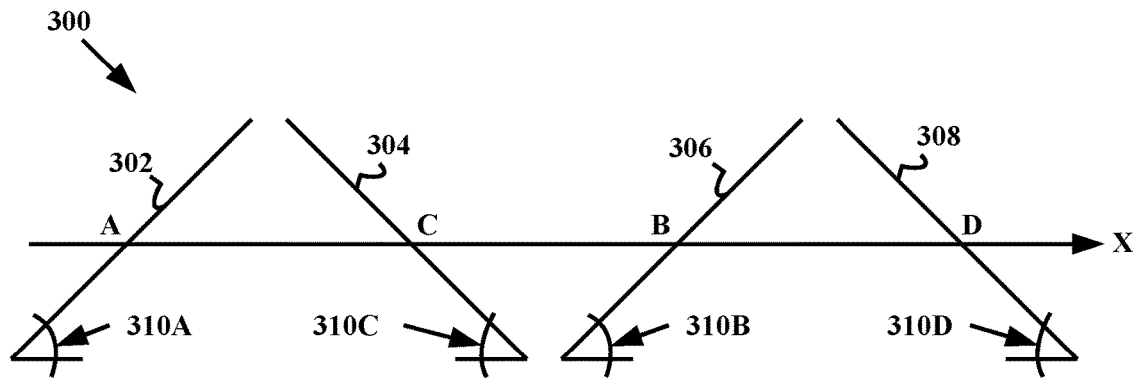
FIG. 3A illustrates a frame of a timing-based-servo pattern, in accordance with embodiments of the present disclosure.

Referring now to FIG. 3A, illustrated is a frame 300 of a timing-based-servo pattern, in accordance with embodiments of the present disclosure. In some embodiments, the timing-based-servo pattern includes the servo marks 302, 304, 306, and 308. It is noted that the timing-based-servo pattern depicted in frame 300 is the M-pattern discussed throughout the present disclosure and is depicted with servo marks 302, 304, 306, and 308 for ease of understanding. It should be further noted however, the timing-based-servo pattern may be the 5-5-5-5 or 5-5-4-4 M-patterns discussed in the present disclosure. In some embodiments, from the timing-based-servo pattern found in frame 300, the terms z-y, and $$\frac{dz}{dt} - \frac{dy}{dt}$$

as discussed in regard to FIG. 2 can be derived from the relative timing of pulses generated by a servo read head, such as one of the servo read heads 104 reading the servo pattern, such as the servo pattern 118 in FIG. 1.

In some embodiments, the frame 300 comprises two sets of parallel servo marks: servo marks 302, 306 and servo marks 304, 308, with each set of servo marks 302, 306 and 304, 308 having equal azimuth angles 310A-D to the servo mark centerline X (e.g., denoted as X to indicate the longitudinal X direction and with each servo mark 302-308 respectively crossing the servo mark centerline X at points A-D) of the timing-based-servo mark but opposite to the other set, and which no servo marks 302, 304, 306, or 308 cross each other. Although for ease of explanation the azimuth angles 310A-D are stated with respect to the servo mark centerline X, any parallel to the servo mark centerline X can be used.

In FIG. 3A, frame 300 comprises parallel servo marks 302 and 306, each respectively having an equal azimuth angle 310A and 310B, which for the purposes of this disclosure are η, which are 45-degrees with respect to the servo mark centerline X; and parallel servo marks 304 and 308, having an equal azimuth angle 310C and 310D, which again for the purposes of this disclosure are η, which are 45-degrees with respect to the servo mark centerline X, but in the opposite direction as the azimuth angles 310A and 310B.

In the arrangement shown in FIG. 3A, parallel servo marks 302 and 306 are interleaved with parallel servo marks 304 and 308, forming a double chevron, or "M" shape/pattern. Again it is noted that multiple servo marks could be interleaved between the servo mark pairs 302, 306 and 304, 308, which would form the 5-5-5-5 or 5-5-4-4 M-patterns discussed in the present disclosure.

Figure 3B:
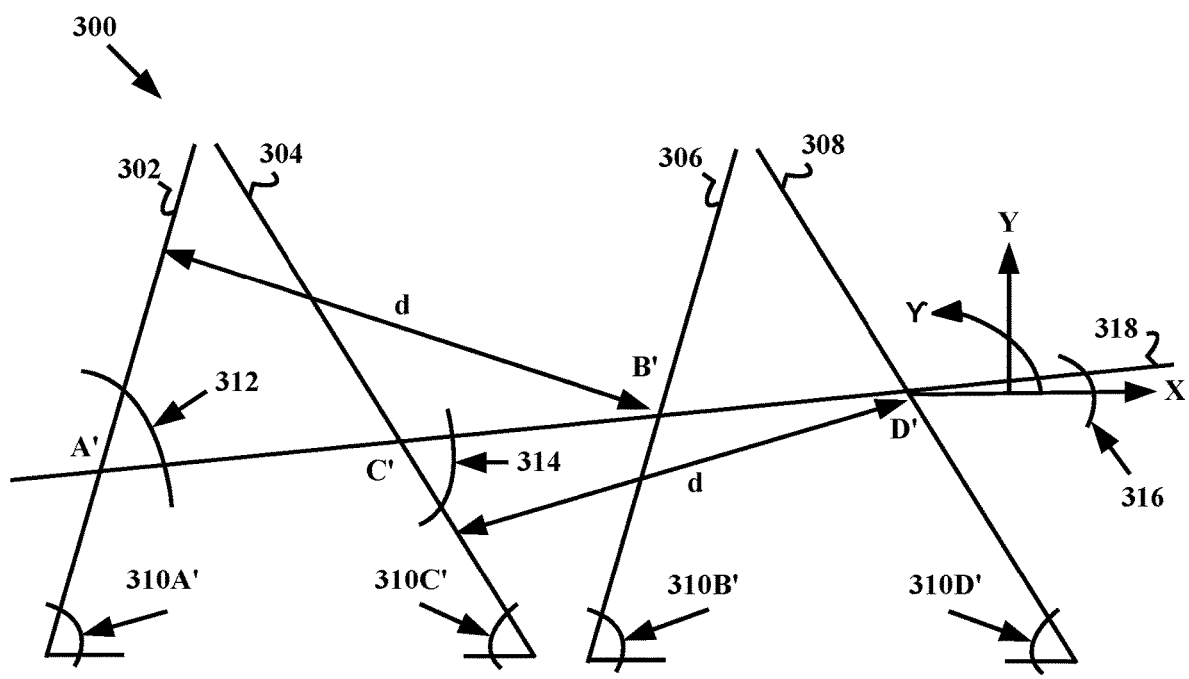
FIG. 3B illustrates a frame of a timing-based-servo pattern demonstrating tape-creep, in accordance with embodiments of the present disclosure.

Referring now to FIG. 3B, illustrated is the frame 300 of a timing-based-servo pattern demonstrating tape-creep, in accordance with embodiments of the present disclosure. It is noted that like reference numerals are used to designate like parts in the accompanying drawings and that the frame 300 depicted in FIG. 3B is the same, or substantially similar to, the frame 300 depicted in FIG. 3A. It is further noted that the frame 300 in FIG. 3B now includes skew angles 312, 314, a trajectory angle 316, and a servo head trajectory 318.

Servo head trajectory 318 represents, for example, the path over servo pattern frame 300 that a servo head 104 would follow when tape 112 is experiencing movement in the lateral Y direction as it moves in the longitudinal X direction. For the purposes of this disclosure, servo head trajectory 318 forms, with the longitudinal X direction, a positive angle 316, which may colloquially be denoted as α. Due to the servo head trajectory 318, being off from the centerline X as depicted in FIG. 3A, the azimuth angles 310A-D distort in a shear distortion angle, which is denoted as ϒ that indicates the timing-based-servo moving in/out of the lateral Y direction. Thus, the azimuth angles 310A-D are no longer at 45-degrees and are depicted as azimuth angles 310A'-D', with azimuth angles 310A' and 310B' now being the angles derived from η+ϒ (e.g., the original 45-degrees plus the inclusion of shear distortion) and azimuth angles 310C' and 310D' being angles derived from η-ϒ (e.g., the original 45-degrees minus the inclusion of shear distortion).

Further, as illustrated, servo head trajectory 318 also forms an angle 312 with parallel servo marks 302, 306, and an angle 314 with parallel servo marks 304, 308. Angles 312 and 314 are respectively η-α+ϒ (e.g., angle 312) and η+α-ϒ (angle 314). Servo head trajectory 318 continues to cross parallel servo marks 302, 306 at points A' and B', respectively, and crosses parallel servo marks 304, 308 at points C' and D', respectively.

Parallel servo marks 302 and 306 are separated by a distance of length d as measured from point A' to B' (e.g., segment A'B'), and parallel servo marks 304 and 308 are separated by an equal distance d as measured from point C' to D' (e.g., segment C'D').

From the evaluation of the angles, segments, and distances found within FIG. 3B, derivations can be performed/obtained by a processor (e.g., in a tape drive, or by the tape drive itself) to determine tape-creep of tape cartridge (e.g., the tape media/magnetic tape within a tape cartridge). To begin:

$$\frac{d}{TD' - TC'} = \sin(\eta + \alpha - \Upsilon),$$

and $$\frac{d}{TB' - TA'} = \sin(\eta - \alpha + \Upsilon),$$

where T refers to time (e.g., meaning TB' is the time at which the tape head finishes reading or writing at point B' which is subtracted by the time at which the tape head starts reading or writing at point A', which would be finding the time it took the tape head to read or write from distance d of segment A'B').

Combining the above equations to eliminate d, the equation below is obtained:

$$\frac{TD' - TC'}{TB' - TA'} = \frac{\sin(\eta - \alpha + \Upsilon)}{\sin(\eta + \alpha - \Upsilon)}.$$

Further expanding the equation directly above:

$$\frac{TD' - TC'}{TB' - TA'} = \frac{\sin(\eta)\cos(\alpha - \Upsilon) - \cos(\eta)\sin(\alpha - \Upsilon)}{\sin(\eta)\cos(\alpha + \Upsilon) + \cos(\eta)\sin(\alpha - \Upsilon)}.$$

is obtained.

Now, the obtained equation is divided by $\cos(\alpha-\Upsilon)$, to obtain:

$$\frac{TD' - TC'}{TB' - TA'} = \frac{1 - \tan(\alpha - \Upsilon)}{1 + \tan(\alpha - \Upsilon)}$$

Then, further solving for $\tan(\alpha-\Upsilon)$, the equation below is obtained:

$$\tan(\alpha - \Upsilon) = \frac{(TB' - TA') - (TD' - TC')}{(TB' - TA') + (TD' - TC')}$$

From the equation directly above, the final equation to be used by the processor to determine tape-creep can be obtained by solving for $(\alpha-\Upsilon)$, in which case obtained is the $\alpha-\Upsilon$ equation:

$$\alpha - \Upsilon = \arctan\frac{(TB' - TA') - (TD' - TC')}{(TB' - TA') + (TD' - TC')}$$

Where $\alpha$ is the trajectory of the magnetic tape over the magnetic head and $\Upsilon$ is the shear distortion angle of the magnetic tape.

In some embodiments, the processor may utilize a method that incorporates the $\alpha-\Upsilon$ equation presented above. In said method, $\alpha$ (the trajectory, e.g., 318 of the tape over the magnetic head) is separated from $\Upsilon$ (the shear distortion angle of the tape). In some embodiments, to separate $\alpha$ (trajectory of the tape over the magnetic head) and $\Upsilon$ (the shear distortion of the tape) is to average $\alpha-\Upsilon$ over several M-patterns. This can be accomplished because $\alpha$ will oscillate between positive and negative values and the average $\alpha$ trajectory angle will necessarily be zero, or close to zero. Thus, said averaging process will result in an average $\Upsilon$, which will reveal the average shear distortion angle of the tape.

In some embodiments, if the average $\Upsilon$ reaches or exceeds a shear distortion threshold, it indicates that the shear distortion of the tape is causing tape creep, leading to a replacement of the tape-media. Whereas, if the average $\Upsilon$ is not over the shear distortion threshold it indicates that the average $\alpha$ trajectory angle is causing/will likely lead to tape creep, with will lead to a realignment of the tape head.

In some embodiments, to find the average $\Upsilon$, a tape drive (e.g., a processor in the tape drive, etc.) may calculate a slope for each of the timing-based-servo marks in a timing-based-servo group. The timing-based-servo marks may be arranged in one or more M-patterns. The tape drive may average the slope for each of the timing-based-servo marks across the one or more M-patterns. The tape drive may generate a least-squares assessment of the averaged slope. The tape drive may determine, from the least-squares assessment, whether the averaged slope is demonstrative of tape-creep. That is, the tape drive may determine, from the slopes of servo marks 302-308 of FIG. 3B, that the servo marks 302-308 shifted since being presented in FIG. 3A, which may indicate that the average shear distortion angle of the tape, $\Upsilon$, has shifted and that tape-creep is may now be indicated for the frame 300.

In some embodiments, the tape drive detects the timing-based-servo marks on the tape cartridge/magnetic tape of the tape cartridge and the tape drive assembles, electronically, the timing-based-servo marks into the one or more M-patterns. In some embodiments, the timing-based-servo marks are written at a 45-degree angle relative to a servo mark of a magnetic media.

In some embodiments, the tape cartridge is a single-reel tape cartridge that stores a tape-media and tape-creep is determined for the tape-media stored in the single-reel tape cartridge. In some embodiments, the tape cartridge is a dual-reel cassette that stores a tape-media and tape-creep is determined for the tape-media stored in the dual-reel tape cassette.

In some embodiments, the tape drive may record data in the tape cartridge/on the tape-media in a parallel-serpentine pattern, in which data is written to the tape in a parallel tracks in lengthwise respect to the tape. In some embodiments, the tape drive may record data in the tape cartridge/on the tape-media in a helical-scan pattern, in which data is written to the tape (e.g., imprinted as data tracks on the tape) at an angle with respect to the edge of the tape.

In some embodiments, to determine whether the averaged slope is demonstrative of tape-creep, the tape drive compares the slope against a threshold during a read operation. The tape drive identifies that the threshold has been exceeded. The tape drive reads all data from the tape cartridge and the tape drive transfers all data to a second tape cartridge. For example, the tape drive may compare the slope of the servo marks 302-308 of FIG. 3A, all of which have (and ideally should have) slopes of 1, thus leading to an average slope of 1, to that of the slopes of servo marks 302-308 of FIG. 3B. In FIG. 3B, the slopes of servo marks 302 and 306 may be 1.5 and servo marks 304 and 308 may have slopes of 1.2, thus the four servo marks 302-308 of FIG. 3B may have an average slope of 1.35.

The tape drive may compare the average slope of the servo marks 302-308 of FIG. 3B to the ideal slope of 1 (of the servo marks 302-308 of FIG. 3A) and determine that the change is that of 35%, the tape drive may determine from a predetermined threshold that a tape-media indicating an average slope equal to or exceeding of 33% is demonstrating severe average shear distortion angle of the tape $\Upsilon$, which is indicative of tape-creep. The tape drive will then perform data saving measures by reading all data from the tape-media and transferring said tape to a second tape-media (e.g., magnetic tape) that is not demonstrating tape-creep.

In some embodiments, the tape drive may alert a user, with an indication (e.g., a beep, a message, etc.) that the threshold has been exceeded (or met).

In some embodiments, a second method may be used that incorporates the $\alpha-\Upsilon$ equation. In said second method, no effort is taken to separate $\alpha$ (e.g., the trajectory angle of the tape over the magnetic head) and $\Upsilon$ (e.g., the shear distortion angle of the tape).

If the measured trajectory angle and shear distortion angle $\alpha-\Upsilon$ is greater than a preselected threshold, then the data contents of the distorted magnetic tape can be moved to a new, suitable magnetic tape/tape cartridge before the data becomes unreadable on the distorted magnetic tape, regardless of whether trajectory angle $\alpha$ or shear distortion angle $\Upsilon$ is at fault.

In some embodiments, a tape drive may calculate slopes for three successive timing-based-servo marks in a timing-based-servo group. The timing-based-servo marks may be arranged in one or more M-patterns and the three successive timing-based-servo marks may be across the one or more M-patterns. The tape drive may perform a parabolic fit of a gradient of the slopes. The tape drive may determine whether the gradient is demonstrative of tape-creep. In some embodiments, the gradient may be determined/identified by the equation:

$$\frac{([3 \times \text{Slope}_1] - [4 \times \text{Slope}_2] + [\text{Slope}_3])}{2}.$$

For example, the tape drive may find the slope of servo marks 302-306 of FIG. 3B (or in some embodiments, three successive servo marks of 116A or 116B). The tape drive may then determine a gradient from the servo marks and perform a parabolic fit of the gradient, which will indicate the distortion in both the x and y directions of the servo marks, which respectively correlate to the trajectory angle α or shear distortion angle Υ. Regardless of whichever angle, e.g., the trajectory angle α or shear distortion angle Υ, is larger, if the gradient exceeds a predetermined/preselected threshold, the tape drive will deem the tape-media with the servo-marks as demonstrating tape-creep and issuing data saving operations.

In some embodiments, one such data saving operation may include terminating the write operation of the tape drive before existing data can be overwritten. That is, when determining that the gradient is demonstrative of tape-creep, the tape drive may compare the gradient against a threshold during a write operation. The tape drive may identify that the threshold has been exceeded and the tape drive may terminate the write operation before existing data can be overwritten. This is because if tape-creep is determined, the tape drive could write data in the wrong location as the tape-media is distorted and thus information not meant to be overwritten could be overwritten.

In some embodiments, in regard to thresholds, there are two preselected thresholds, one for when a tape drive system is writing to magnetic tape and one for when the tape drive system is reading from the magnetic tape. During write operations, a write threshold is used, which is more restrictive and rigid compared to a read threshold that will be discussed in more depth below. During the write operations, a WRITE_VERIFY process is used, which allows the tape drive system to read the data immediately after it is written to the magnetic tape. The tape drive system determines if the data is written properly to the magnetic tape. If the tape drive detects a write threshold number of inconsistencies/unreadable data on the magnetic tape immediately after being written to, the tape drive system will alert a user that a new magnetic tape is needed, or, in some embodiments, the tape drive system will automatically begin transferring data over from the magnetic tape to another magnetic tape in the tape drive system.

During read operations, a normal READ process is used, which allows the tape drive system to read the data is was instructed to read. The tape drive system determines if the data is written properly to the magnetic tape. If the tape drive then determines if it detects a read threshold number of unreadable data on the magnetic tape, the tape drive system will alert a user that a new magnetic tape is needed, or, in some embodiments, the tape drive system will automatically begin transferring data over from the magnetic tape to another magnetic tape in the tape drive system.

In some embodiments, the read threshold is less restrictive than the write threshold (e.g., the read threshold allows for more inconsistencies/unreadable data on the magnetic tape) because reading from the tape does not involve likely writing over and losing data as can happen with write operations. Further, the less restrictive write threshold can allow for cartridge interchange between tape drives, e.g., the tape drive system is allowed to finish reading all data it was instructed to before initiating mitigating/data saving operations (e.g., transferring of the data from one magnetic tape/tape cartridge to another magnetic tape/tape cartridge).

In some embodiments, a third method may be used that converts the time-domain data of the α−Υ equation to frequency domain data. In said third method, a Fast Fourier Transform (FFT) is employed over several (5-5-4-4) M-patterns to separate α (e.g., the trajectory angle of the tape over the magnetic head) and Υ (e.g., the shear distortion angle of the tape). With the separation of α and Υ, one is able to determine, from a preselected α threshold and/or a preselected Υ threshold whether α and/or Υ is causing tape-creep (e.g., whether tape-creep is being caused by the trajectory of the tape over the magnetic head and/or the shear distortion of the tape).

In some embodiments, a tape drive may arrange the timing-based-servo marks into a timing-based-servo pattern. The timing-based-servo pattern is at least one M-pattern (e.g., the 5-5-4-4 M-pattern). The tape drive may select the at least one M-pattern. The tape drive may match at least two timing-based-servo marks in the at least one M-pattern. The tape drive may determine, from the matching, whether an alignment of the at least two timing-based-servo marks is demonstrative of tape-creep. In some embodiments, due to the FFT nature of the third method, the alignment is determined from found oscillations, movements, which is discussed more fully below.

In some embodiments, the timing-based-servo pattern may include a first set of servo marks that include five consecutive angled lines directed toward a midway of the timing-based-servo pattern and which touch a second set of servo marks. The second set of servo marks include five consecutive angled lines directed away from the midway of the timing-based-servo pattern and which touch a third set of servo marks. The third set of servo marks include five consecutive angled lines directed away from the midway of the timing-based-servo pattern and which touch a fourth set of servo marks, and the fourth set of servo marks include five consecutive angled lines directed toward the midway of the timing-based-servo pattern. In some embodiments, the timing-based-servo pattern is from a European Computer Manufacturers Association (ECMA)-319 tape cartridge.

In some embodiments, the third method discussed starts by using the FFT to convert time-domain data into frequency domain data. By use of the FFT of the α− Υ equation and the complex conjugate of the FFT, the power spectrum is calculated.

The components of α (e.g., the trajectory of the tape over the magnetic head) is identified in the power spectrum to help isolate Υ (e.g., the shear distortion of the tape), which can identify one of three things listed below.

One, tape vibration that is due to any idlers in the tape path, which would be found at:

$\omega_{IDLER} = V/R_{IDLER}$, where $\omega_{IDLER}$ is the angular frequency of an idler, V is the recording velocity of the tape, and $R_{IDLER}$ is the idler radius.

If $\omega_{IDLER}$ is found to be above an angular frequency threshold, it indicates that Υ, the shear distortion of the tape is too high, and is likely damaging the integrity of the tape to properly be store data (e.g., be written to/read from) because the idlers are distorting the alignment of the servo marks discussed above.

Two, tape vibration due to each tape reels (e.g., of a dual-reel tape cassette) can be found and would be found at:

$\omega_{Supply\text{-}Reel} = V/R_{supply\text{-}Reel}$ and $\omega_{Takeup\text{-}Reel} = V/R_{Takeup\text{-}Reel}$, where $\omega_{Supply\text{-}Reel}$ is the angular frequency of a supply reel, $\omega_{Takeup\text{-}Reel}$ is the angular frequency of a take-up reel, and where $R_{supply\text{-}Reel}$ and $R_{Takeup\text{-}Reel}$ are the respective radii of the outer wraps of tape.

If $\omega_{Supply\text{-}Reel}$ and/or $\omega_{Takeup\text{-}Reel}$ are found to be above respective angular frequency thresholds, it indicates that $\Upsilon$, the shear distortion of the tape is too high, and is likely damaging the integrity of the tape to properly be store data (e.g., be written to/read from).

Thirdly, longitudinal oscillations in a tape path can manifest themselves in changes in the trajectory angle, $\alpha$. The equation for longitudinal oscillation (e.g., $\omega$ that is angular frequency) in a reel-to-reel tape path incorporates tape vibration due to the spring-rate "k" of the magnetic tape and the mass moment of inertia "I" of each tape reels, the equation thus being represented as:

$$\omega = \sqrt{\left\{k \times \left[\frac{R_{Supply-Reel}^2}{I_{Supply-Reel}^2} + \frac{R_{Takeup-Reel}^2}{I_{Takeup-Reel}^2}\right]\right\}}$$

where k=EA/L,
E=Young's Modulus of Magnetic Tape,
A=Cross-sectional area of Magnetic Tape,
L=Length of Tape; and where
$R_{supply\text{-}Reel}$ and $R_{Takeup\text{-}Reel}$ are the respective radii of the outer wraps of tape, and
$I_{supply\text{-}Reel}$ and $I_{Takeup\text{-}Reel}$ are the respective mass moments of inertial of the supply and take-up reels.

Thus, if $\omega$ is found to be above an oscillation threshold, it indicates that $\alpha$, the trajectory angle of the tape over the magnetic head is too high, and is likely causing the tape head to not accurately read from and/or write to the tape due to non-alignment.

It is noted that the frequencies associated with isolate $\Upsilon$ (the shear distortion of the tape) are likely to be much lower than the frequencies associated with trajectory angle $\alpha$. Thus, the angular thresholds are likely to be relatively much higher than the that of the oscillation threshold(s). It is further noted that all or some of the methods discussed herein this disclosure are contemplated to be used individually or in any combination of one another.

Figure 4:
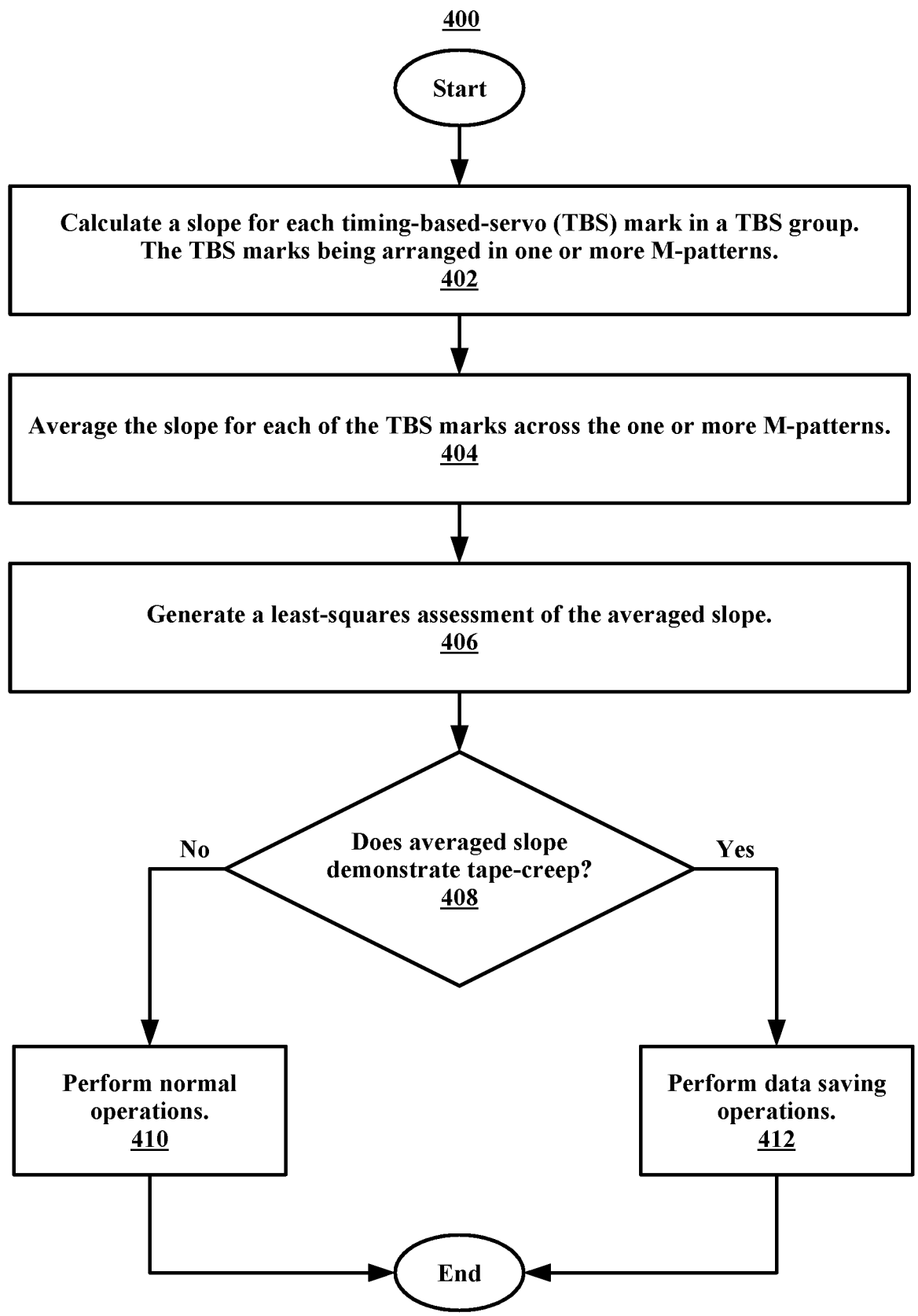
FIG. 4 illustrates a flowchart of an example method for averaging the slope of timing-based-servo marks to determine tape-creep, in accordance with embodiments of the present disclosure.

Referring now to FIG. 4, illustrates a flowchart of an example method 400 for averaging the slope of timing-based-servo marks to determine tape-creep, in accordance with embodiments of the present disclosure. In some embodiments, the method 400 may be performed by a processor/microprocessor of a tape drive system or by the tape drive system itself.

In some embodiments, the method 400 begins at operation 402, where the processor calculates a slope for each timing-based-servo mark in a timing-based-servo group. The timing-based-servo marks are/have been arranged in one or more M-patterns. The method 400 proceeds to operation 404, where the processor averages the slope for each of the timing-based-servo marks across the one or more M-patterns.

The method 400 proceeds to operation 406, where the processor generates a least-squares assessment of the averaged slope. The method 400 proceeds to decision block 408, where the processor determines, from the least-squares assessment, if the averaged slope is demonstrative of tape-creep.

If, at decision block 408, the processor determines that the averaged slope is not demonstrative of tape-creep, the method 400 proceeds to operation 410. At operation 410, the processor performs normal operations of the tape drive system (e.g., reading/writing of tape media). In some embodiments, after operation 410, the method 400 ends. In some embodiments, after operation 410, the method 400 continually repeats itself to ensure the tape drive system can continue to perform normal operations.

If, however, at decision block 408, the processor determines that the averaged slope is demonstrative of tape-creep, the method 400 proceeds to operation 412. At operation 412, the processor performs data saving operations of the tape media being read from/written to by the tape drive system. For example, the processor can read all data from the tape media (e.g., in a tape cartridge, etc.) and/or transfer all data to a second tape media (e.g., on a second tape cartridge). In some embodiments, after operation 412, the method 400 ends.

Figure 5:
FIG. 5 illustrates a flowchart of an example method for identifying the gradient of slopes for three successive timing-based-servo marks to determine tape-creep, in accordance with embodiments of the present disclosure.

Referring now to FIG. 5, illustrates a flowchart of an example method 500 for identifying the gradient of slopes for three successive timing-based-servo marks to determine tape-creep, in accordance with embodiments of the present disclosure. In some embodiments, the method 500 may be performed by a processor/microprocessor of a tape drive system or by the tape drive system itself.

In some embodiments, the method 500 begins at operation 502, where the processor calculates a slope for three successive timing-based-servo marks in a timing-based-servo group. The timing-based-servo marks are/have been arranged in one or more M-patterns and the three successive timing-based-servo marks are across the one or more M-patterns. The method 500 proceeds to operation 504, where the processor performs a parabolic fit of a gradient of the slopes.

The method 500 proceeds to decision block 506, where the processor determines, from the parabolic fit, if the gradient is demonstrative of tape-creep. If, at decision block 506, it is determined that the gradient is not demonstrative of tape-creep, the method 500 proceeds to operation 508.

At operation, 508 the processor performs normal operations of the tape drive system (e.g., reading/writing of tape media). In some embodiments, after operation 508, the method 500 ends. In some embodiments, after operation 508, the method 500 continually repeats itself to ensure the tape drive system can continue to perform normal operations.

If, however, at decision block 506, the processor determines that the gradient is demonstrative of tape-creep, the method 500 proceeds to operation 510. At operation 510, the processor performs data saving operations of the tape media being read from/written to by the tape drive system. For example, the processor can terminate any write operations currently being conducted or set to be conducted and/or the processor can alert a user that a new tape media is needed in order to perform further write operations, etc. In some embodiments, after operation 510, the method 500 ends.

Figure 6:
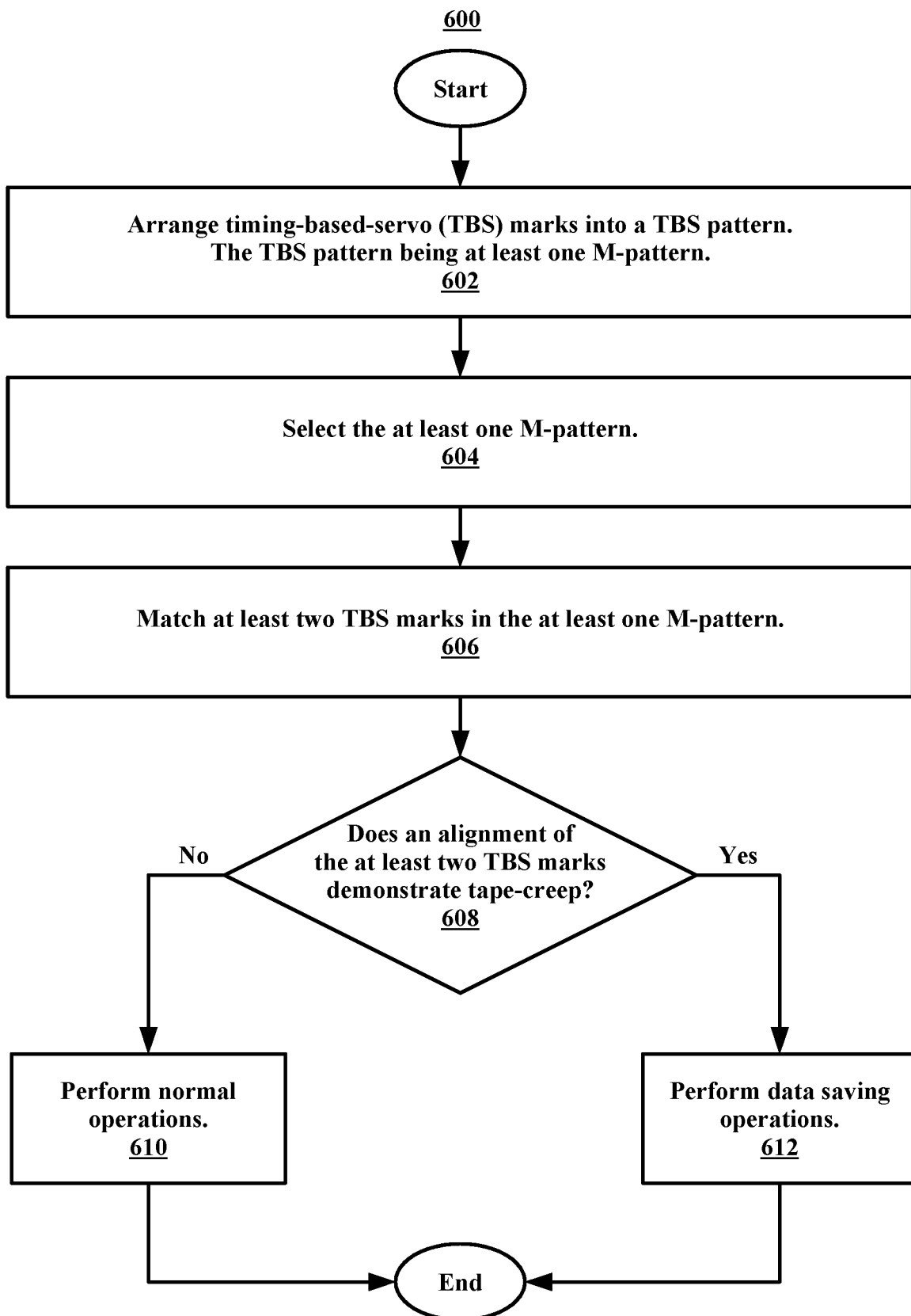
FIG. 6 illustrates a flowchart of an example method for arranging timing-based-servo marks to determine tape-creep, in accordance with embodiments of the present disclosure.

Referring now to FIG. 6, illustrates a flowchart of an example method 600 for arranging timing-based-servo marks to determine tape-creep, in accordance with embodiments of the present disclosure. In some embodiments, the method 600 may be performed by a processor/microprocessor of a tape drive system or by the tape drive system itself.

In some embodiments, the method 600 begins at operation 602, where the processor arranges (e.g., logically, digitally, etc.) the timing-based-servo marks into a timing-based-servo pattern. The timing-based-servo pattern is at least one M-pattern. The method 600 proceeds to operation 604, where the processor selects the at least one M-pattern.

The method 600 proceeds to operation 606, where the processor matches (e.g., compares, aligns, etc.) at least two timing-based-servo marks in the at least one M-pattern. The method 600 proceeds to decision block 608, where it is determined if the alignment of the at least two timing-based-servo marks is demonstrative of tape-creep.

If, at decision block 608, the processor determines that the alignment is not demonstrative of tape-creep, the method 600 proceeds to operation 610. At operation 610, the processor performs normal operations of the tape drive system (e.g., reading/writing of tape media). In some embodiments, after operation 610, the method 600 ends. In some embodiments, after operation 610, the method 600 continually repeats itself to ensure the tape drive system can continue to perform normal operations.

If, however, at decision block 608, the processor determines that the alignment is not demonstrative of tape-creep, the method 600 proceeds to operation 612. At operation 612, the processor performs data saving operations of the tape media being read from/written to by the tape drive system. For example, the processor can read all data from the tape media (e.g., in a tape cartridge, etc.) and/or transfer all data to a second tape media (e.g., on a second tape cartridge). In some embodiments, after operation 612, the method 600 ends.

It is noted that the flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for allowing a tape drive to write to a tape cartridge with timing-based-servo marks, the method comprising:
   calculating slopes for three successive timing-based-servo marks in a timing-based-servo group, wherein the timing-based-servo marks are arranged in one or more M-patterns, and wherein the three successive timing-based-servo marks are across the one or more M-patterns;
   performing a parabolic fit of a gradient of the slopes;
   determining whether the gradient is demonstrative of tape-creep; and
   writing, from the tape drive, to the tape cartridge.

2. The method of claim 1, wherein the gradient is determined by the equation (3*Slope 1−4*Slope2+Slope3)/2.

3. The method of claim 1, further comprising:
   detecting the timing-based-servo marks on the tape cartridge; and
   assembling, electronically, the timing-based-servo marks into the one or more M-patterns.

4. The method of claim 1, wherein the timing-based-servo marks are written at a 45-degree angle relative to a servo track of a magnetic media.

5. The method of claim 1, wherein the tape cartridge is a single-reel tape cartridge that stores a tape-media, and wherein the tape-creep is determined for the tape-media stored in the single-reel tape cartridge.

6. The method of claim 1, wherein the tape cartridge is a dual-reel tape cassette that stores a tape-media, and wherein the tape-creep is determined for the tape-media stored in the dual-reel tape cassette.

7. The method of claim 1, further comprising:
   recording data in the tape cartridge in a parallel-serpentine pattern.

8. The method of claim 1, further comprising:
   recording data in the tape cartridge in a helical-scan pattern.

9. The method of claim 1, wherein determining whether the gradient is demonstrative of tape-creep comprises:
   comparing, during a write operation, the gradient against a threshold;
   identifying that the threshold has been exceeded; and
   terminating the write operation before existing data can be overwritten.

10. The method of claim 9, further comprising:
    alerting a user, with an indication, that the threshold has been exceeded.

11. A system comprising:
    a tape drive; and
    a tape cartridge with timing-based-servo marks, wherein the tape drive writes to the tape cartridge, and wherein the tape drive is configured to perform the operations comprising:
    calculating slopes for three successive timing-based-servo marks in a timing-based-servo group, wherein the timing-based-servo marks are arranged in one or more M-patterns, and wherein the three successive timing-based-servo marks are across the one or more M-patterns;
    performing a parabolic fit of a gradient of the slopes; and
    determining whether the gradient is demonstrative of tape-creep.

12. The system of claim 11, wherein the gradient is determined by the equation (3*Slope 1−4*Slope2+Slope3)/2.

13. The system of claim 11, wherein the operations further comprise:
   detecting the timing-based-servo marks on the tape cartridge; and
   assembling, electronically, the timing-based-servo marks into the one or more M-patterns.

14. The system of claim 11, wherein the timing-based-servo marks are written at a 45-degree angle relative to a servo track of a magnetic media.

15. The system of claim 11, wherein the tape cartridge is a single-reel tape cartridge that stores a tape-media, and wherein the tape-creep is determined for the tape-media stored in the single-reel tape cartridge.

16. The system of claim 11, wherein the tape cartridge is a dual-reel tape cassette that stores a tape-media, and wherein the tape-creep is determined for the tape-media stored in the dual-reel tape cassette.

17. The system of claim 11, wherein the operations further comprise:
   recording data in the tape cartridge in a parallel-serpentine pattern.

18. The system of claim 11, wherein the operations further comprise:
   recording data in the tape cartridge in a helical-scan pattern.

19. The system of claim 11, wherein determining whether the slope is demonstrative of tape-creep comprises:
   comparing, during a write operation, the slope against a threshold;
   identifying that the threshold has been exceeded; and
   terminating the write operation before existing data can be overwritten.

20. The system of claim 19, wherein the operations further comprise:
   alerting a user, with an indication, that the threshold has been exceeded.

* * * * *